United States Patent [19]
Crnkovic et al.

[11] Patent Number: 5,815,805
[45] Date of Patent: Sep. 29, 1998

[54] APPARATUS AND METHOD FOR ATTENUATING AN UNDESIRED SIGNAL IN A RADIO TRANSCEIVER

[75] Inventors: James John Crnkovic, Lake Zurich; Jin Dong Kim, Chicago, both of Ill.

[73] Assignee: Motorola, Inc., Schaumburg, Ill.

[21] Appl. No.: 880,316

[22] Filed: Jun. 23, 1997

Related U.S. Application Data

[63] Continuation of Ser. No. 386,601, Feb. 10, 1995, abandoned, which is a continuation of Ser. No. 102,931, Aug. 6, 1993, abandoned.

[51] Int. Cl.$^6$ .................................................. H04B 1/40
[52] U.S. Cl. ........................... 455/78; 455/575; 455/129
[58] Field of Search ................................. 455/63, 78, 80, 455/107, 126, 129, 300, 575

[56] References Cited

U.S. PATENT DOCUMENTS

| | | | |
|---|---|---|---|
| 3,891,926 | 6/1975 | Ishman et al. | 455/126 |
| 4,233,607 | 11/1980 | Sanford et al. | 455/78 |
| 4,384,363 | 5/1983 | Lipcon | 455/78 |
| 4,475,243 | 10/1984 | Batlivala et al. | 455/78 |
| 4,561,111 | 12/1985 | Conner | 455/63 |
| 4,823,133 | 4/1989 | Anflo et al. | 342/199 |
| 4,897,863 | 1/1990 | Newland . | |
| 4,952,193 | 8/1990 | Talwar | 455/67.6 |
| 5,014,346 | 5/1991 | Phillips et al. | 455/90 |
| 5,212,815 | 5/1993 | Schumacher | 455/126 |
| 5,230,093 | 7/1993 | Rich et al. | 455/126 |

OTHER PUBLICATIONS

Dyna TAC Cellular Mobile Telephone Instruction Manual, May 1, 1986, Motorola Inc. Communications Sector.
Dyna TAC Cellular Mobile Telephone Instruction Manual, 1985, Motorola Inc. Communications Sector.

*Primary Examiner*—Edward F. Urban
*Attorney, Agent, or Firm*—Kevin D. Kaschke

[57] ABSTRACT

A portable radio transceiver (100) includes a transmitter (101) and a receiver (103) operating at different respective frequencies. The transmitter (101) is capable of producing an undesired signal (121) including a frequency substantially equal to the receiver operating frequency (107). A first antenna (102) is coupled to the transmitter (101). A second antenna (104) is coupled to the receiver (103) and electrically isolated (122) from the first antenna (102) by a predetermined degree such that the undesired signal (121) received by the second antenna (104) is attenuated by the predetermined degree of electrical isolation (122). An optional filter (112), coupled to an input terminal of an amplifier (113) in the transmitter (101), is adapted to attenuate the undesired signal (121) such that the undesired signal (121) received by the second antenna (104) is further attenuated. An optional directional attenuator (115), coupled between the amplifier (113) and the first antenna (102), is adapted to attenuate an interfering signal (123) received by the first antenna (102) such that the undesired signal (121) received by the second antenna (104) is further attenuated.

10 Claims, 3 Drawing Sheets

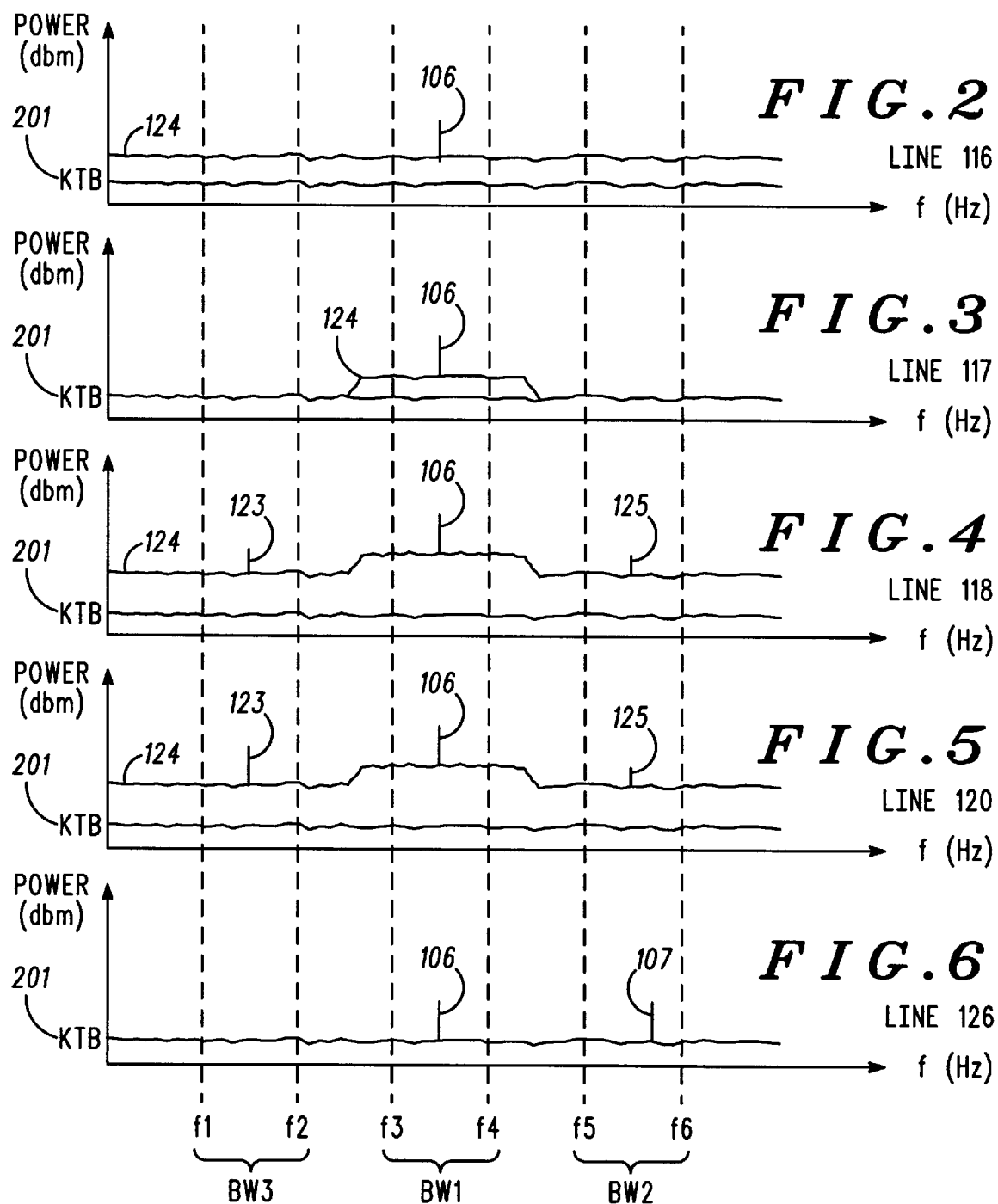

FIG.7

| TRANSMITTER ELEMENT | LOSS (db) | PRIOR ART POWER OUT(mW) | INVENTION POWER OUT(mW) |
|---|---|---|---|
| POWER AMPLIFIER | — | 1019 | 721 |
| POWER DETECTOR | 0.3 | 951 | 673 |
| DIRECTIONAL ATTENUATOR | 0.5 | — | 673 |
| Tx FILTER | 2.0 | 600 | 600 |
| ANTENNA | — | 600 | 600 |
| POWER AMPLIFIER CURRENT (mA)<br>• 0.65 EFFICIENTLY AND<br>• 100 mW POWER IN | | 236 | 159 |

APPARATUS AND METHOD FOR ATTENUATING AN UNDESIRED SIGNAL IN A RADIO TRANSCEIVER

This is a continuation of application Ser. No. 08/386,601, filed Feb. 10, 1995 and now abandoned, which is a continuation of application Ser. No. 08/102,931, filed Aug. 6, 1993 and now abandoned.

FIELD OF THE INVENTION

The present invention relates generally to a portable radio transceivers and more particularly to an apparatus and method for attenuating an undesired signal in a portable radio transceiver.

BACKGROUND OF THE INVENTION

The basic operation and structure of communication systems, such as cellular radio telephone systems communication systems and land mobile communication systems, are well known in the art. Communication systems typically comprise a plurality of communication units, a predetermined number of base stations (or repeaters) located throughout a geographic region and a controller. The communication units may be vehicle mounted or portable units and comprise either a transmitter or a receiver or both a transmition and a receiver to form a transceiver. The communication unit is coupled to the base station by a communication channel over which radio frequency (RF) signals are transmitted and/or received. The controller comprises a centralized call processing unit or a network of distributed controllers working together to establish communication paths for the communication units.

A transceiver generally comprises a single communication unit including both a transmitter and a receiver operating at different respective frequencies. A duplex filter is often used to couple the transmitter and receiver to a common antenna. In essence, the duplex filter includes a transmit filter and a receive filter in the transmit and receive paths, respectively. The transmit filter in the transmit path is generally designed to attenuate frequencies in a bandwidth including the operating frequency of the receiver, while the receive filter in the receive path is designed to attenuate frequencies in a bandwidth including the operating frequency of the transmitter.

In some communication systems, the separation between adjacent edges of the receive and transmit bandwidths may be relatively close. A problem encountered in such systems the duplex filter uses the receive filter to attenuate the transmitter frequency without unduly attenuating the desired receive signal, and likewise uses the transmit filter to attenuate the receiver frequency without unduly attenuating the transmit signal. This filtering problem becomes more severe when the transmitter is operating near the end of the transmit bandwidth that is close to the receive bandwidth, because the receive filter must be able to discriminate and pass the desired receive frequency but attenuate the undesired frequency to a significant extent. In order to achieve higher frequency performance the duplex filter is generally provided with more poles and more complex physical and/or electrical configuration.

The frequencies attenuated by the transmit filter in a bandwidth including the operating frequency of the receiver are primarily thermal noise frequencies and intermodulation frequencies. Thermal noise frequencies are generated by the transmitter circuitry at all frequencies, including the bandwidth of the receive filter, as thermal noise produced by the transmitter's circuit is amplified. Intermodulation frequencies are generated when an interfering frequency outside the bandwidth of the receiver filter is received by the antenna. The interfering frequency passes through the transmit filter and mixes with the transmit signal to produce an image frequency that lies within the bandwidth of the receive filter. The thermal noise frequencies and intermodulation frequencies generally represent undesired signals that limit the performance of the receiver.

Several approaches have been taken to form duplex filters comprising the receive and transmit filters. The receive and transmit filters of the duplex filter have been formed using a cascaded arrangement of discrete single pole ceramic bandstop/bandpass filters intercoupled by quarter wave transmission lines. Alternatively, the receive and transmit filters of the duplex filter have been formed from a monolithic ceramic block comprising several integral resonators. The receive and transmit filters have been formed from separate blocks or they may be integrated into a single block. Alternatively, the receive and transmit filters of the antenna duplexer have been formed as an array of helical resonator filters mounted in a common housing.

It is well known in the art that the electrical characteristics of a filter comprising the cascaded arrangement of individual resonators can be varied by changing the number of resonators and/or by altering the electrical characteristics of the individual resonators (or poles) of the filter and/or by altering the nature of coupling between adjacent resonators.

A consequence of duplex filters with high filtering performance is that they tend to be both large in size and costly to manufacture. The high cost is an obvious disadvantage. The large size means that high performance filters are not compatible with portable transceiver apparatus where miniaturization is desirable.

A further disadvantage of high performance duplex filters is the associated insertion loss. That is to say, the larger amount of filtering of the undesired signal, the higher the loss to the desired signal. However, the larger the amount of loss to the desired signal, the greater the signal power required at the input to the filter to maintain a certain transmit power level. Increasing the transmitter's signal power necessarily increases the amount of current required by the transmitter. In portable transceiver apparatus, increased current drain reduces the time that the transceiver apparatus can be used. In prior art transceivers it has been necessary to strike a delicate compromise in the transmitter between the requirement to reject receiver frequencies and an acceptable level of insertion loss.

In duplex radio transceivers it is also widely recognized in the art that the most difficult filtering requirement is that of removing the relatively large power signal produced by the transmitter from small signal circuits in the receiver. A greater the level of transmitter power can be removed by increasing the receive filter performance. However, the larger the amount of filtering, then the higher is the loss to the desired signal, as mentioned above. In order to maintain usable receiver sensitivity there is a finite limit to the amount of loss that can be tolerated in the receiver circuit before amplification. In prior art transceivers it has been necessary to strike a delicate compromise in the receiver circuit between the requirement to reject transmitter frequencies and an acceptable level of insertion loss.

Accordingly, there is a need for an improved apparatus and method for attenuating an undesired signal in a portable radio transceiver.

BRIEF DESCRIPTION OF THE DRAWINGS

The present invention will be better understood when read with reference to the accompanying drawings in which:

FIG. 2 illustrates a graphical plot of a signal at the input to a filter of the transmitter of FIG. 1 in accordance with the present invention;

FIG. 3 illustrates a graphical plot of a signal at the output of a filter of the transmitter of FIG. 1 in accordance with the present invention;

FIG. 4 illustrates a graphical plot of a signal at the output of an amplifier of the transmitter of FIG. 1 in accordance with the present invention;

FIG. 5 illustrates a graphical plot of a signal at a first antenna of the transmitter of FIG. 1 in accordance with the present invention;

FIG. 6 illustrates a graphical plot of a signal at a second antenna of the receiver of FIG. 1 in accordance with the present invention; and FIG. 7 illustrates a table listing, by example, characteristics of the transmitter of FIG. 1 for the present invention and the prior art.

DETAILED DESCRIPTION OF A PREFERRED EMBODIMENT

Figure 1:
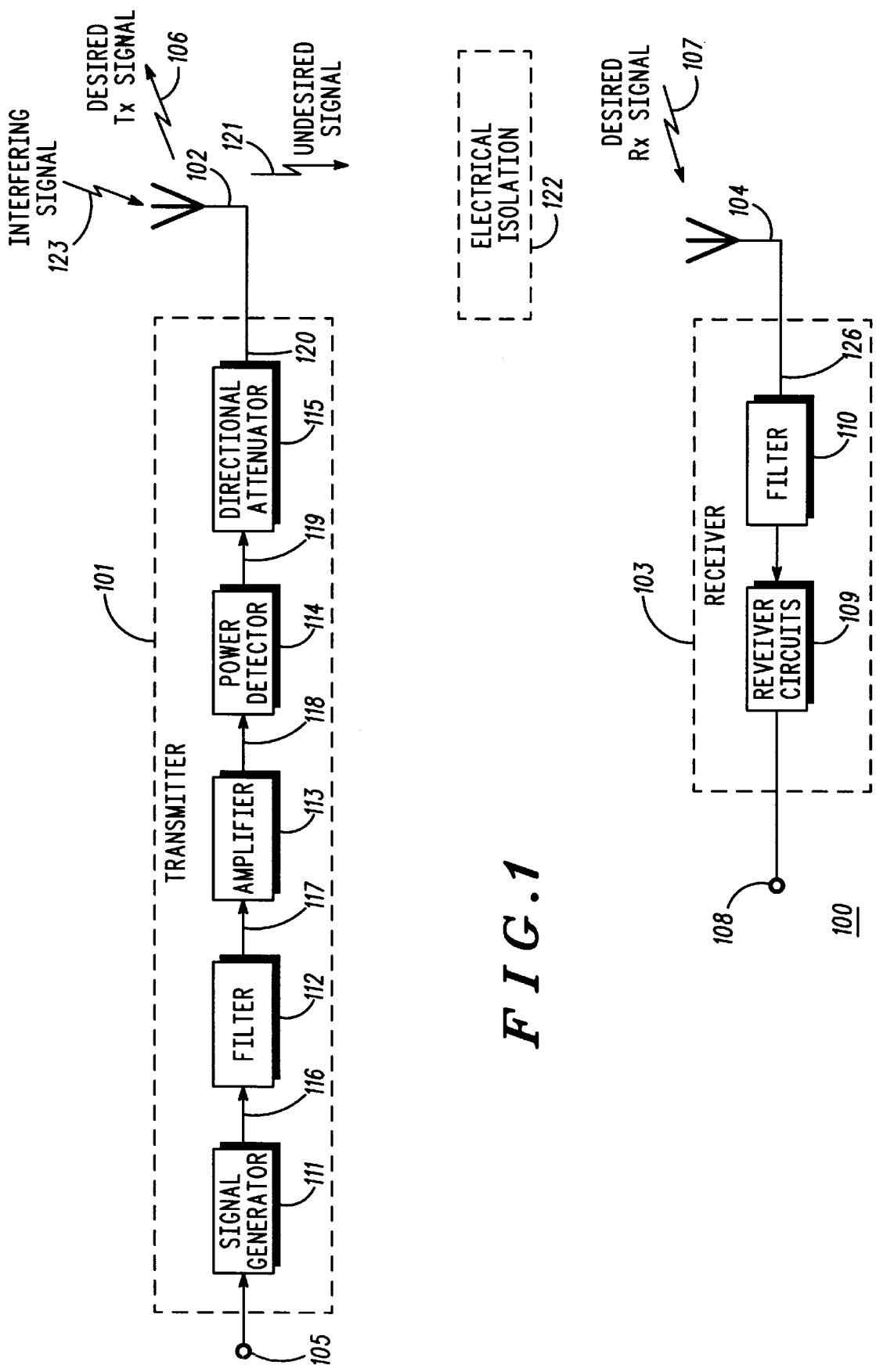
FIG. 1 illustrates, a schematic block diagram of a portable radio transceiver including a transmitter and a receiver in accordance with the present invention.

The foregoing need is substantially met by an improved apparatus and method for attenuating an undesired signal in a radio transceiver. A portable radio transceiver includes a transmitter and a receiver operating at different respective frequencies. The transmitter is capable of producing an undesired signal including a frequency substantially equal to the receiver operating frequency.

In accordance with one embodiment of the present invention, a first antenna is coupled to the transmitter. A second antenna is coupled to the receiver and electrically isolated from the first antenna by a predetermined degree such that the undesired signal received by the second antenna is attenuated by the predetermined degree of electrical isolation.

Optionally, a filter, coupled to an input terminal of a transmitter amplifier, is adapted to attenuate the undesired signal such that the undesired signal received by the second antenna is further attenuated. Optionally, a directional attenuator, coupled between the amplifier and the first antenna, is adapted to attenuate an interfering signal received by the first antenna such that the undesired signal received by the second antenna is further attenuated.

The detailed description of the preferred embodiment of the present invention can be better understood when read with reference to the accompanying drawings illustrated in FIGS. 1–7.

FIG. 1 illustrates, a schematic block diagram of a novel portable radio transceiver 100 generally includes a transmitter 101 coupled to a first antenna 102 and a receiver 103 coupled to a second antenna 104. The transmitter 101 is operable to receive an input signal at line 105 for transmission as a desired transmit (Tx) signal 106 by the first antenna 102. The receiver 103 is operable to receive a desired receive (Rx) 107 signal for producing a received signal at line 108. The receiver generally comprises receiver circuits 109 and a filter 110. Individually, the transmitter 101, the receiver 103, the first antenna 102 and the second antenna 104 are well known in the art, thus no further discussion will be presented except to facilitate the understanding of the present invention.

The transmitter 101 generally comprises a signal generator 111, an optional filter 112, an amplifier 113, a power detector 114, and an optional directional attenuator 115. The signal generator 111 receives the input signal at line 105 to produce a modulated signal at line 116 suitable for transmission. The optional filter 112 filters the modulated signal 116 to produce a filtered signal at line 117. The amplifier 113 amplifies the filtered signal at line 117 to produce an amplified signal at line 118. The power detector 114 detects the power level of the amplified signal at line 118. For the sake of simplicity, the amplified signal at line 118 is essentially the same at line 119. The optional directional attenuator receives the amplified signal at line 119 to produce a transmit signal at line 120. Individually, the signal generator 111, the optional filter 112, the amplifier 113, the power detector 114, and the optional directional attenuator 115 are well known in the art, thus no further discussion will be presented except to facilitate the understanding of the present invention. The radio transceiver 100 of FIG. 1 may include other well known elements such as a controller and an audio processor (both not shown) as is well known in the art.

In the portable radio transceiver 100, the transmitter 101 and the receiver 103 operate at different respective frequencies. The transmitter is capable of producing an undesired signal 121 including a frequency substantially equal to the receiver's operating frequency. In accordance with preferred and alternate embodiments of the present invention, an apparatus and method for attenuating the undesired signal 121 in a radio transceiver 100 will be described and illustrated in detail below.

According to a preferred embodiment of the present invention, the second antenna 104 is electrically isolated 122 from the first antenna 102 by a predetermined degree such that the undesired signal 121 received by the second antenna 104 is attenuated by the predetermined degree of electrical isolation 122. The first antenna 102, the second antenna 104, the undesired signal 121 and the predetermined degree of electrical isolation 122 will be described and illustrated in detail below.

In accordance with a first alternative embodiment of the present invention, the optional filter 112, coupled to the input terminal of the amplifier 113, is adapted to attenuate the undesired signal 121 such that the undesired signal 121 received by the second antenna 104 is further attenuated. The optional filter 112 and the amplifier 113 will be described and illustrated in detail below.

The first antenna 102 is capable of receiving an interfering signal 123 at a frequency capable of mixing with a signal 106 substantially equal to the transmitter operating frequency to produce the undesired signal 121. In accordance with a second alternative embodiment of the present invention, the optional directional attenuator 115, coupled between the output terminal of the amplifier and the first antenna, is adapted to attenuate the interfering signal 123 received by the first antenna 102 such that the undesired signal 121 received by the second antenna 104 is further attenuated. The interfering signal 123 and the optional directional attenuator 115 will be described and illustrated in detail below.

The preferred embodiment of the present invention may advantageously be combined with either or both of the alternate embodiments presented in order to effect the attenuation of the undesired signal 121 received by the second antenna 104.

The radio transceiver of the present invention may be advantageously implemented in a portable cellular radio telephone, similar to a Motorola portable cellular telephone, model number F09HYD8455BA.

In the preferred embodiment of the present invention, the operable frequencies, in a cellular system, of the transmitter are from 824.04 MHz to 848.97 MHz and the receiver are 869.04 MHz to 893.97 MHz as is well known in the art.

In the preferred embodiment of the present invention, the receiver circuits 109 are a group of circuits designed to demodulate the desired signal 107 and reject all other frequencies coming to the second antenna 104. The receiver circuits 109 consist of the following sub-circuits (not shown) all which are well known in the art. A low noise amplifier, designed to amplify the desired signal 107, similar to Oki part number KGF1175, with 12 dB gain and 1.5 dB noise figure. A mixer, used to downconvert the carrier frequency of desired signal 107 to an intermediate frequency, similar to Oki part number KGF1155, with 10 dB conversion gain and 6 dB noise figure. A crystal filter, used to selectively filter the downconverted desired signal and attenuate other downconverted undesired signals, similar to NDK part number 45S34AA, a 2 pole filter with 2 dB insertion loss. A backend integrated IF circuit, used in conjunction with piezoelectric ceramic filters to selectively filter all unwanted signals other than the desired frequencies and amplify, downconvert, and demodulate the waveform into its baseband audio or data components. The integrated circuit is similar to Signetics part number NE/SA604, used in conjunction with ceramic IF filters, similar to Murata part number SFGCC455BX.

In the preferred embodiment of the present invention, the filter 110 is a bandpass SAW filter, similar to Fujitsu part number FAR-F5CC-881M50-L2AB. This filter has less than 3.5 dB insertion loss in the receive frequency band and greater than 20 dB rejection in the transmit frequency band.

In the preferred embodiment of the present invention, the signal generator 111 is a phase lockable voltage controlled oscillator (VCO) with output buffer, capable of producing a stable, modulated signal in the transmit frequency band, from 824.04 MHz to 848.97 MHz, with output power of 0 dBm. The VCO and output buffer is similar to FDK part number ID071A837M50.

In the preferred embodiment of the present invention, the power amplifier 113 is capable of amplifying the signal generator 111 output from 0 dBm to +28 dBm, similar to Fujitsu power amplifier module part number FMC080802-21. This embodiment may also be done in discrete stages, such as a discrete buffer amplifier for amplification of the signal generator signal from 0 dBm to 10 dBm, using a transistor part such as Motorola MRF941 as the active component. A second discrete stage, capable of amplification of the signal from 10 dBm to +20 dBm, such as NMC part number XULA104SA as the active component, and a third discrete stage, used for amplification of the signal from +20 dBm to +28 dBm, such as NMC part number XULA180XB as the active component.

In the preferred embodiment of the present invention, the power detector is a directional coupler designed directly on a printed circuit board. A main transmission line of the coupler is coupled from the output of power amplifier 113 to the first antenna 102. A secondary coupled line is coupled lightly to main transmission line, typically 14 dB less than the transmitted signal on the main transmission line. The coupled signal is rectified and converted using passive components to a dc signal proportional to the transmitted power, where it is used to monitor the transmitted energy of the power amplifier circuit. This circuit is similar to the circuit used in a Motorola portable cellular telephone, model number F09HYD8455BA.

In the preferred embodiment of the present invention, the undesired signal produced by the transmitter 101 includes a first undesired signal and a second undesired signal. The first undesired signal is described as thermal noise. Thermal noise is the wideband gaussian noise level present in all matter at temperatures greater than zero degrees kelvin. For a particular bandwidth and temperature, the thermal noise level can characterized by the equation $Pn=kTB$, where $Pn$ is the thermal noise power in watts, k is Boltzmann's constant $=1.38 \times 10^{\wedge}23$ watts per kelvin, T is the temperature in degrees kelvin, and B is the bandwidth in hertz. Thermal noise is a well understood phenomenon and can be further referenced in "Introduction to Radio Frequency Design", by W. H. Hayword, Prentice Hall, copyright 1982, page 203.

The second undesired signal is described as an intermodulated signal. The intermodulated signal can be created by undesired signal 123 coming into the transmit antenna 106 in the frequency band 2*Tx–Rx, where the transmit (Tx) frequency is from 824.04 to 848.97 MHz, and the received (Rx) frequency is from 869.04 to 898.97 MHz. Since a cellular system is constructed so there is always a 45 MHz offset between the desired transmit signal and the desired receive signal, the undesired interfering signal can always be found exactly 45 MHz below the Tx frequency. Hence the band of undesired frequencies hitting the Tx antenna 106 capable of causing the undesired intermodulation signal will be from 779.04 to 803.97 MHz. The undesired frequency is received on transmit antenna 102, where it will proceed through the power detector 114 with minimal attenuation and into the power amplifier circuit 113. Due to nonlinearities in the power amplifier circuit 113, the interfering signal 123 will mix with the desired transmit signal 106, and generate an intermodulation product at frequency 2*Tx–interfering frequency at line 118, which is the same as the Rx frequency.

Hence the intermodulation frequency created as a result of the mixing of the transmit signal 106 and interfering signal 123 will interfere directly with the desired received frequency if it is not attenuated in the mixing process sufficiently.

In the preferred embodiment of the present invention, the first and second antennae are quarter wave helical antennae, similar to the antenna in the down position on the portable radio telephone, model F09HYD8455BA. The first helical antenna 102 is tuned to a resonant frequency designed to optimize transmission of the desired transmit signal 106, whereas the receive antenna 104 is designed to optimize reception of the desired receive signal 107.

In the preferred embodiment of the present invention, the electrical isolation is produced by physical separation of the two antennas. The antennae are electrically separated by a sufficient distance so as to minimize the coupling between the antennae to advantageously attenuate the undesired signals 121 that are radiated by the first antenna 102. Separation of the two antennae advantageously reduce the requirements of the receive filter 110 and reduce or eliminate the need for the transmit filter 115. The electrical isolation 122, typically desired to be greater than 20 dB due to physical separation, can also be achieved by physically rotating one antenna to be 90° when referenced to the other. Also, the antennas can be physically isolated by designing one antenna to be optimized for E field transmission and the other antenna be optimized for H field transmission. Additionally, the electrical isolation 122 can be implemented with an electrically reflective barrier such as a conductive shield or an electrically absorbing material as is well known in the art.

The primary purpose of this approach is to increase the talk time of the user when using a portable cellular telephone having a battery of limited energy capacity. This is accomplished by eliminating the need for a conventional transmit filter after the power amplifier 113. The transmit filter normally serves 3 main purposes in cellular telephone applications. The first is to reduce the amplified thermal noise coming out of the power amplifier 113 in the receive frequency band that can desensitize the radio to the incoming desired signal 107. This embodiment solves that problem by electrically separating the two antennas sufficiently such that the amplified noise transmitted by transmit antenna 102 is sufficiently attenuated by the time it is received by receive antenna 104 such that the contribution of the transmitted noise becomes negligible compared to the thermal noise level already in the receive circuits.

The second purpose of the conventional transmit filter is to reduce undesired signals coming into transmit antenna 102 that can mix in power amplifier circuit 113 to generate intermodulation products that can desensitize the receiver to receiving desired signal 107. This embodiment solves that problem by sufficiently electrically isolating antenna 102 and 104 such that the intermodulation interfering signal 123 created in power amplifier 113 is attenuated sufficiently that the ratio of the undesired signal 123 compared to desired signal 107 is more than a predetermined amount, typically 60 dB as specified in a typical cellular system.

The third reason for a conventional transmit filter is to create an impedance match in the receive frequency band when the transmitter and receiver are using a common antenna such that the transmit filter's receive frequency band appears as an open circuit to the incoming receive signal. The need for the transmit filter is eliminated since this embodiment uses two separate antennas. The separation of the antennas is sufficient that coupling between the two is attenuated so the receive band will look like an open circuit to the receive signal when received on receive antenna 104.

Eliminating the conventional transmit filter reduces the insertion loss between the PA and the transmitter antenna by 1.5 dB. This will reduce the signal level at the output of the power amplifier by 1.5 dB, thereby reducing the transmit current by needed by the power amplifier 113. Further details describing the reduction in transmit current comparing the present invention to the prior art will be discussed below with FIG. 7.

In the first alternative embodiment of the present invention, the filter 112 is implemented after the signal generator 111 and before the power amplifier 113. The transmit filter is used to attenuate the thermal noise generated by the signal generator and buffer circuitry, so amplified thermal noise in the receive frequency band at 116 is attenuated to unamplified thermal noise at the output of the filter 117. This filter is similar to Fujitsu bandpass SAW filter FAR-5FCC-836M50-L2AA, with 3.5 dB insertion loss and 20 dB attenuation in the receive frequency band. This filter 112 may also be placed between multiple stages of the power amplifier circuit 113, so ideally the thermal noise level entering the last power amplifier stage is equal to the thermal noise floor. This embodiment reduces the amplified thermal noise signal at the output of the power amplifier 118 and hence at the transmit antenna 102. Therefore the electrical isolation 122 required between the transmit antenna 102 and the receive antenna 104 is reduced.

In the second alternative embodiment of the present invention, the directional attenuator 115 is placed between the power detector 114 and the transmit antenna 102. A directional attenuator 115 is a device designed to permit essentially unattenuated passage of a signal in one direction but significantly attenuate a signal coming in the opposite direction. This part is similar to TDK isolator CU41LA1P-1P-T, with 0.5 dB typical insertion loss in the low loss direction and 20 dB typical attenuation in the high loss direction. This device is placed in the transmitter 101 so that the low loss attenuation path is directed from the power detector 114 to the transmit antenna 102. The insertion loss in the forward direction, from the power amplifier 113 to the antenna, of the directional attenuator 115 is typically lower than a transmit filter. The advantage of using this device is to attenuate the interfering signal 123 entering the transmit antenna 107 before it can mix in the power amplifier circuit 113 which generates an intermodulation signal at the receive frequency at the output of the power amplifier 118.

FIGS. 2–6 illustrates a graphical plot of various signals in the portable transceiver 100. Each plot illustrates frequency domain vs. spectral power.

FIG. 2 illustrates a graphical plot of a signal at line 116 at the input to the filter 112 of the transmitter 101 of FIG. 1 in accordance with the present invention. The desired transmit signal 106 amplified significantly above amplified thermal noise 124. The amplified thermal noise 124 is amplified significantly above the thermal noise floor 201.

FIG. 3 illustrates a graphical plot of a signal 117 at the output of the filter 112 of the transmitter of FIG. 1 in accordance with the present invention. The desired transmit signal 106 and amplified thermal noise 124 negligibly attenuated in transmit band BW1 by the filter 112. The filter 112 attenuates the undesired amplified noise 124 in the receive band BW2 as well as other frequencies such that the amplified noise is reduced back to the thermal noise floor 201 in the receive bandwidth BW2.

FIG. 4 illustrates a graphical plot of a signal at line 118 at the output of the amplifier 113 of the transmitter 101 of FIG. 1 in accordance with the present invention. The desired transmit signal 106 and amplified thermal noise 124 are significantly amplified vs. their respective levels in FIG. 3. FIG. 4 also shows the attenuated interfering signal 123 present after entering at the transmit antenna 102 and proceeding through the directional attenuator 115 in the reverse direction. The level of attenuated interfering signal 123 has been significantly reduced by directional attenuator 115. The mixing of the attenuated interfering signal 123 in BW3 and the transmit signal 106 in BW1 generates the mixed intermodulation signal 125 in BW2 of the receiver. The level of mixed intermodulation signal 125 is attenuated below the level of undesired signal 123, typically by 10 dB, due to the mixing process in the power amplifier 113.

FIG. 5 illustrates a graphical plot of a signal at line 120 at a first antenna 102 of the transmitter 101 of FIG. 1 in accordance with the present invention. FIG. 5 is essentially the same as FIG. 4, except that the interfering signal 123 is significantly higher than the interfering signal 123 in FIG. 4. This is because the interfering signal 123 at line 120 is unattenuated by the directional attenuator 115 since the undesired signal 123 is traveling in the reverse direction. The level of the mixed intermodulation signal 125 in FIG. 5 is essentially the same as it is in FIG. 4 because the directional attenuator 115 has relatively low loss in the forward direction from the power detector 114 to the transmit antenna 102.

FIG. 6 illustrates a graphical plot of a signal at line 126 at second antenna 104 of the receiver 103 of FIG. 1 in accordance with the present invention. Due to the electrical isolation of the transmit antenna 102 and the receive antenna 104, the mixed intermodulation signal 125 present in FIG. 5 is no longer present in FIG. 6 since it is significantly below the thermal noise floor. Also, due to the electrical isolation 102 of the transmit antenna 102 and the receive antenna 104, the amplified thermal noise floor present in FIG. 5 is significantly below the thermal noise floor present in FIG. 6. The desired received signal 107 is present at the input to the filter 126. Due to the electrical isolation 122 of the transmit antenna 102 and the receive antenna 104, the transmit signal 106 is present but at a much lower level than in FIG. 5. It is further attenuated by the filter 110.

FIG. 7 illustrates a table listing, by example, characteristics of the transmitter 101 of FIG. 1 for the present invention and the prior art. The following discussion provides a practical example illustrating the advantages of the present invention. FIG. 7 shows the typical losses associated with a transmitter 101 from the output of the final power amplifier device 113 to the first antenna 102. The higher the insertion loss after power amplifier 113, the higher the power amplifier signal at line 119 generated at the output of the power amplifier 113 must be to maintain the specified power output at the first antenna 102. For analog cellular portable radiotelephones, the specified output power level is 600 mW.

The present art shows losses after the power amplifier accumulating to 2.3 dB typical, whereas the present invention reduces those losses to 0.8 dB. Assuming the final stage of the power amplifier 113 has a 100 mW input power and 65% power added efficiency, the current drain (I) of the power amplifier is calculated as I=(Power out−Power in)/(Drain voltage×power added efficiency). The current drain (I) of the power amplifier 113 is 236 mA in the prior art versus 159 mA in the present invention. Since the rest of the radiotelephone typically consumes 150 mA, the prior art radio consumes a total of 386 mA vs. 309 mA for the present invention. This advantageously corresponds to a 20% increase in usage of the radiotelephone (i.e. customer talk time).

Thus, it is apparent that there is provided an improved apparatus and method for attenuating an undesired signal in a portable radio transceiver 100 which fully meets the needs set forth above. According to the present invention, the first antenna 102 is coupled to the transmitter 101. The second antenna 104 is coupled to the receiver 103 and electrically isolated 122 from the first antenna 102 by a predetermined degree such that the undesired signal 121 received by the second antenna 104 is attenuated by the predetermined degree of electrical isolation 122. Optionally, the filter 112 and/or the directional attenuator 115 effect the undesired signal 121 such that the undesired signal 121 received by the second antenna 104 is further attenuated. With the present invention the problems associated with the transmit filter of the prior art are substantially resolved advantageously resulting in substantial reduction of the transmitter's current drain as well as a reduction of the portable radio transceiver's size and complexity.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. In a portable radio transceiver including a transmitter and a receiver operating at different respective frequencies, wherein the transmitter includes an amplifier having input and output terminals, and wherein the transmitter produces an undesired intermodulation signal at a frequency within the receiver's operating frequency, an apparatus for attenuating the undesired intermodulation signal comprising:

a first antenna coupled to the transmitter and adapted to receive an interfering signal having a frequency that combines with a signal substantially equal to the transmitter operating frequency in the amplifier to produce the undesired intermodulation signal;

a second antenna coupled to the receiver and configured to be electrically isolated from the first antenna by a predetermined degree to attenuate the undesired intermodulation signal received by the second antenna; and a directional attenuator coupled between the output terminal of the amplifier and the first antenna, wherein the directional attenuator is adapted to attenuate the interfering signal received by the first antenna to further attenuate the undesired intermodulation signal received by the second antenna.

2. An apparatus according to claim 1 further comprising:

a filter coupled to the input terminal of the amplifier and adapted to attenuate an undesired noise signal to attenuate the undesired noise signal received by the second antenna.

3. In a portable radio transceiver including a transmitter and a receiver operating at different respective frequencies, wherein the transmitter includes an amplifier having input and output terminals, wherein an interfering signal having a frequency combines with a signal substantially equal to the transmitter operating frequency in the amplifier to produce an undesired intermodulation signal at a frequency within the receiver's operating frequency, and wherein the transmitter produces an undesired noise signal at a frequency within the receiver's operating frequency, an apparatus for attenuating the undesired intermodulation signal and the undesired noise signal comprising:

a first antenna coupled to the transmitter;

a second antenna coupled to the receiver and configured to be electrically isolated from the first antenna by a predetermined degree to attenuate the undesired intermodulation signal and the undesired noise signal received by the second antenna;

a directional attenuator coupled between the output terminal of the amplifier and the first antenna, wherein the directional attenuator is adapted to attenuate the interfering signal received by the first antenna to further attenuate the undesired intermodulation signal received by the second antenna; and a filter coupled to the input terminal of the amplifier and adapted to attenuate the undesired noise signal to further attenuate the undesired noise signal received by the second antenna.

4. A portable radio transceiver comprising:

a transmitter and a receiver operating at different respective frequencies;

an amplifier having input and output terminals and adapted to amplify signals in the transmitter;

a first antenna coupled to the transmitter and adapted to receive an interfering signal having a frequency that combines with a signal substantially equal to the transmitter operating frequency in the amplifier to produce an undesired intermodulation signal;

a second antenna coupled to the receiver and configured to be electrically isolated from the first antenna by a predetermined degree to attenuate the undesired intermodulation signal received by the second antenna; and a directional attenuator coupled between the output terminal of the amplifier and the first antenna, wherein the directional attenuator is adapted to attenuate the interfering signal received by the first antenna to further attenuate the undesired intermodulation signal received by the second antenna.

5. A portable radio transceiver according to claim 4 further comprising:

a filter coupled to the input terminal of the amplifier and adapted to attenuate an undesired noise signal to attenuate the undesired noise signal received by the second antenna.

6. In a portable radio transceiver including a transmitter, coupled to a first antenna and a receiver, coupled to a second antenna operating at different respective frequencies, wherein the transmitter includes an amplifier having input and output terminals, a directional attenuator coupled between the output terminal of the amplifier and the first antenna, wherein an interfering signal having a frequency combines with a signal substantially equal to the transmitter operating frequency in the amplifier to produce an undesired intermodulation signal at a frequency within the receiver's operating frequency, and wherein the transmitter produces an undesired noise signal at a frequency within the receiver's operating frequency, a method for attenuating the undesired intermodulation signal and the undesired noise signal comprising the step of:

configuring the first antenna, coupled to the transmitter, to be electrically isolated by a predetermined degree from the second antenna, coupled to the receiver, to attenuate the undesired intermodulation signal and the undesired noise signal received by the second antenna; and attenuating the interfering signal, using the directional attenuator, received by the first antenna to further attenuate the undesired intermodulation signal received by the second antenna.

7. A method according to claim 6 further comprising the step of:

filtering the undesired noise signal coupled to the input terminal of the amplifier to attenuate the undesired noise signal to further attenuate the undesired noise signal received by the second antenna.

8. In a portable radio transceiver including a transmitter, coupled to a first atenna and a receiver, coupled to a second atenna operating at different respective frequencies, wherein the transmitter includes an amplifier having input and output terminals, a directional attenuator coupled between the output terminal of the amplifier and the first antenna, wherein an interfering signal having a frequency combines with a signal substantially equal to the transmitter operating frequency in the amplifier to produce an undesired intermodulation signal at a frequency within the receiver's operating frequency, and wherein the transmitter produces an undesired noise signal at a frequency within the receiver's operating frequency, a method for attenuating the undesired intermodulation signal and the undesired noise signal comprising the steps of:

configuring the first antenna, coupled to the transmitter, to be electrically isolated by a predetermined degree from the second antenna, coupled to the receiver, to attenuate the undesired intermodulation signal and the undesired noise signal received by the second antenna;

attenuating the interfering signal, using the directional attenuator, received by the first antenna to further attenuate the undesired intermodulation signal received by the second antenna; and filtering the undesired noise signal coupled to the input terminal of the amplifier to attenuate the undesired noise signal to further attenuate the undesired noise signal received by the second antenna.

9. A method of operating a radio transceiver comprising the steps of:

operating a transmitter, coupled to a first antenna and a receiver, coupled to a second antenna at different respective frequencies, wherein the transmitter includes an amplifier having input and output terminals, a directional attenuator coupled between the output terminal of the amplifier and the first antenna, wherein an interfering signal having a frequency combines with a signal substantially equal to the transmitter operating frequency in the amplifier to produce an undesired intermodulation signal at a frequency within the receiver's operating frequency, and wherein the transmitter produces an undesired noise signal at a frequency within the receiver's operating frequency;

configuring the first antenna, coupled to the transmitter, to be electrically isolating by a predetermined degree from the second antenna, coupled to the receiver, to attenuate the undesired intermodulation signal and the undesired noise signal, at a frequency within the receiver's operating frequency, produced by the transmitter and received by the second antenna; and attenuating the interfering signal, using the directional attenuator, received by the first antenna to further attenuate the undesired intermodulation signal received by the second antenna.

10. A method according to claim 9 further comprising the step of:

filtering the undesired noise signal coupled to the input terminal of the amplifier to attenuate the undesired noise signal to further attenuate the undesired noise signal received by the second antenna.

* * * * *